US012800356B2

(12) United States Patent
McKendrick

(10) Patent No.: US 12,800,356 B2
(45) Date of Patent: Nov. 17, 2026

(54) MEASUREMENT DEVICE

(71) Applicant: RENISHAW PLC, Wotton-under-Edge (GB)

(72) Inventor: Alexander David McKendrick, Edinburgh (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 17/265,877

(22) PCT Filed: Sep. 10, 2019

(86) PCT No.: PCT/GB2019/052513
§ 371 (c)(1),
(2) Date: Feb. 4, 2021

(87) PCT Pub. No.: WO2020/053566
PCT Pub. Date: Mar. 19, 2020

(65) Prior Publication Data

US 2021/0199473 A1 Jul. 1, 2021

(30) Foreign Application Priority Data

Sep. 12, 2018 (EP) .................................... 18275142

(51) Int. Cl.
*G01D 5/245* (2006.01)
*G01D 5/347* (2006.01)

(52) U.S. Cl.
CPC ....... *G01D 5/2457* (2013.01); *G01D 5/34746* (2013.01)

(58) Field of Classification Search
CPC ............ G01D 5/24438; G01D 5/2457; G01D 5/34715; G01D 5/34746; G01D 5/366; H03M 1/308
See application file for complete search history.

(56) References Cited

U.S. PATENT DOCUMENTS 4,451,731 A * 5/1984 Leonard ................ H03M 1/308 250/237 G
4,901,073 A * 2/1990 Kibrick ................ H03M 1/308 341/13

(Continued)

FOREIGN PATENT DOCUMENTS

CN 1293367 C 1/2007
DE 1814785 A1 * 6/1970 ........... G01D 5/2457

(Continued)

OTHER PUBLICATIONS

Machine Translation EP 0195130 (Year: 1986).*

(Continued)

*Primary Examiner* — Steven L Yeninas
(74) *Attorney, Agent, or Firm* — Oliff PLC

(57) ABSTRACT

An incremental measurement encoder including a scale and a readhead. The scale includes a periodic series of features forming an incremental track and at least one reference mark. The readhead including a structured light source and a reference mark photodetector array. The at least one reference mark can include at least one imaging element configured to form an image of the structured light source onto the reference mark photodetector array.

4 Claims, 7 Drawing Sheets

(56) References Cited

U.S. PATENT DOCUMENTS

| | | | | | |
|---|---|---|---|---|---|
| 5,003,170 | A * | 3/1991 | Masuda | H03M 1/308 250/237 G |
| 5,302,820 | A | 4/1994 | Henshaw et al. | |
| 6,198,534 | B1 | 3/2001 | Hofer et al. | |
| 7,141,780 | B2 * | 11/2006 | Homer | G01D 5/366 250/231.13 |
| 10,281,301 | B2 * | 5/2019 | Slack | G01D 5/38 |
| 2004/0007664 | A1 | 1/2004 | Mitchell | |
| 2004/0036016 | A1 | 2/2004 | Homer et al. | |
| 2006/0092047 | A1 * | 5/2006 | Ng | G01D 5/34715 341/50 |
| 2006/0108515 | A1 * | 5/2006 | Watanabe | G01D 5/38 250/231.13 |
| 2006/0180748 | A1 | 8/2006 | Schoser et al. | |
| 2006/0267822 | A1 | 11/2006 | Ito | |
| 2006/0283035 | A1 * | 12/2006 | Gordon-Ingram | G01D 5/366 33/707 |
| 2008/0013105 | A1 * | 1/2008 | McMurtry | G01D 5/366 356/618 |
| 2009/0057406 | A1 * | 3/2009 | Yaku | G01D 5/36 235/454 |
| 2009/0135435 | A1 * | 5/2009 | Zwilling | G01D 5/366 356/616 |
| 2010/0072456 | A1 * | 3/2010 | Weston | G01D 5/34715 257/85 |
| 2012/0262733 | A1 * | 10/2012 | Atherton | G01D 5/34746 356/623 |
| 2016/0209246 | A1 | 7/2016 | Kato | |
| 2018/0216972 | A1 * | 8/2018 | Slack | G01D 5/2448 |

FOREIGN PATENT DOCUMENTS

| | | | | |
|---|---|---|---|---|
| DE | 10 2015 016 780 | A1 | 7/2016 | |
| EP | 0195130 | A2 * | 9/1986 | G01D 5/366 |
| JP | H08-50036 | A | 2/1996 | |
| JP | 2004-520591 | A | 7/2004 | |
| JP | 2005-83808 | A | 3/2005 | |
| JP | 2010-508501 | A | 3/2010 | |
| JP | 2017-111068 | A | 6/2017 | |
| JP | 6684087 | B2 | 4/2020 | |
| WO | 94/25830 | A1 | 11/1994 | |
| WO | 2005/124282 | A2 | 12/2005 | |
| WO | 2007/057645 | A1 | 5/2007 | |
| WO | 2008/053184 | A1 | 5/2008 | |
| WO | 2015/049174 | A1 | 4/2015 | |
| WO | 2017/203210 | A1 | 11/2017 | |

OTHER PUBLICATIONS

Machine Translation DE 1814785 (Year: 1970).*

Mar. 7, 2019 Extended Search Report issued in European Patent Application No. 18275142.0.

Nov. 22, 2019 International Search Report issued in International Patent Application No. PCT/GB2019/052513.

Nov. 22, 2019 Written Opinion of the International Searching Authority issued in International Patent Application No. PCT/GB2019/052513.

Hutley, M. C. "Diffraction gratings—(Techniques of physics)". Academic Press Inc (London) Ltd. 1982. pp. 294-301. ISBN: 0-12-362980-2.

* cited by examiner (b)

(c)

MEASUREMENT DEVICE

The invention of the current application relates to a measurement device, in particular a measurement encoder comprising a scale and a readhead, the scale comprising an incremental track and a reference mark.

Typically, a measurement encoder comprises a scale and a readhead movable relative to one another. One type of known encoder is an optical encoder where the scale may be provided with scale markings on the surface and the readhead may comprise a light source to illuminate the scale and a detector to detect a light pattern produced by the interaction between the light, the scale and any other optical components present, to thereby determine relative motion of the scale and readhead. In particular, an incremental measurement encoder commonly comprises a scale having incremental features which are periodically arranged. Typically, some form of periodic signal is generated when relative movement between the measurement scale and readhead takes place. This signal is counted and the displacement between the scale and readhead can be determined. Such counting can take place within or outside of the readhead (e.g. the readhead could output the periodic signals and/or the readhead can output a count of said periodic signal). The periodic signal could be in the form of a SINE wave. Often a plurality of periodic signals are generated, which are offset from each other, e.g. by 90°. Typically, these signals are referred to as SIN and COS signals. It is known that these signals can be interpolated in order to improve the resolution of the encoder.

Also known are measurement scales with one or more reference marks, i.e. marks which provide a positional "reference" point on the measurement scale. A reference mark may allow for the verification of the accuracy of the incremental count, and/or for determining a reference position of the readhead relative to the scale, for example when incremental count has been lost (e.g. due to a power failure) or is inaccurately made due to factors like too fast a travel of the readhead, or dirt on the scale. It is known to provide the reference mark next to the incremental features (such that the incremental features and reference mark are in separate tracks) or to embed the reference mark within the incremental features (such that the incremental features and reference mark are in the same track). WO2005/124282 discloses a reference mark can embedded within the incremental features. Typically, a reference mark is configured to provide a signal pulse (either positive or negative) at a reference mark detector in the readhead. Such a signal pulse could be in the form of a pulse of light (caused by either an increase or decrease of light reaching the reference mark detector). The encoder apparatus can analyse this pulse to determine a reference position between the scale and the readhead. A reference mark signal can be output in response thereto (e.g. the encoder apparatus can output a reference mark signal down a signal line, for example to an interface unit and/or external device). For example, one or more thresholds can be used to identify the presence of the reference mark. It can be preferred for the pulse to be distinct (e.g. having a relatively large amplitude, and a relatively narrow width) in order to make it easy to identify the presence of the reference mark, to avoid false reference mark detections (e.g. caused by dirt) and/or to increase the resolution of the reference mark.

As will be understood, references to "light" in this application are references to electromagnetic radiation (EMR) which falls anywhere in EMR spectrum from ultraviolet to infrared (inclusive). Likewise, the use of the term "optical", such as in "optical encoder" refers to the encoder operating using EMR which falls anywhere in the EMR spectrum from ultraviolet to infrared (inclusive).

WO 2008/053184 A1 discloses a readhead for a scale reading apparatus, FIG. 15 shows an arrangement of components within the readhead. A first LED 15 is shown for illuminating an incremental track on a scale, light from which forms an incremental pattern and is then detected by incremental detectors shown either side of the LED 15. Also shown is an LED 50 for illuminating a reference mark, the light from which is detected by reference mark detectors 51.

US 2006/0180748 A1 discloses a position measurement system that includes an incremental graduated track, a scanning unit includes a light source 21, incremental signal detectors 230 and reference mark signal detectors 240.

U.S. Pat. No. 7,141,780 discloses an encoder apparatus, in which the reference mark comprises a pattern of features which correlates with a mask pattern to provide a reference mark signal.

US2006/0267822 discloses an optical encoder comprising a light source 110 and a scale 120. The scale comprising an optical pattern 124 which forms a bright and dark pattern on a photodetector array 154, and a reference position pattern 122.

Light reflected at the reference position pattern 122 is incident on photodetector group 152.

WO2015/049174 discloses an encoder apparatus comprising at least one light source configured such that there is structure in the light projected towards the scale. A readhead is configured such that the structure is angled so that it is substantially misaligned with respect to features of a scale.

The present invention relates to an improved measurement encoder, in particular an improved incremental measurement encoder. The encoder comprises a scale and a readhead. The scale can comprise a periodic series of marks forming an incremental scale track. The scale can also comprise at least one reference mark.

According to a first aspect of invention there is provided an incremental measurement encoder comprising a scale and a readhead, the scale comprising a periodic series of features forming an incremental track and at least one reference mark comprising at least one imaging element. The readhead can comprise a structured light source. The readhead can comprise a reference mark photodetector array. The at least one imaging element could be configured to form/project an image of the structured light source onto the reference mark photodetector array. The structured light source may comprise an array of unevenly spaced light sources. The photodetector array may comprise a non-continuous series of photodetector elements arranged to correlate with the structured light source.

It has been found that the arrangement of the present invention enables a relatively distinct reference mark signal (e.g. pulse) to be produced at the reference mark photodetector array for a relatively small reference mark. This can be particularly advantageous when the reference mark is embedded within the incremental features, because the smaller the reference mark, the smaller the adverse effect the reference mark has on the incremental signal. In particular, it has been found that such an arrangement can help to allow for a repeatable determination of when the readhead is in a position relative to the scale corresponding to the reference mark. For example, such an arrangement can help to provide for a reference mark signal (e.g. which is output by the encoder apparatus) which is repeatable to within an incremental scale mark width, and may be repeatable to within a unit of measurement of the encoder system, where this is desired. This can be particularly difficult to do in fine pitch incremental encoders (e.g. incremental encoders where the scale period is less than 20 μm (microns)).

As will be understood, imaging spatially inverts the copy of the object that is being imaged. Accordingly, as will be understood, the image formed by the imaging element will be a spatially inverted representation/copy of the structured light source. Another optical member could be included to revert the copy of the structured light source such that it is not spatially inverted when it finally falls on the reference mark photodetector array, however this would involve having to provide additional optical elements. Accordingly, preferably, the imaging element causes a spatially inverted representation/copy of the structured light source to fall on the reference mark photodetector array.

As will be understood, other terms for the imaging element of the reference mark include imager, or imaging means/device/member. The imaging element may comprise at least one of: i) a lens (e.g. cylindrical or spherical lens, or a Fresnel Lens); ii) a diffractive imaging element (such as a Fresnel Zone Plate (FZP)); or iii) a feature configured to provide an image by a pinhole effect. Such a feature (for providing the imaging by a pinhole effect) could be an elongate pinhole (e.g. such a feature could be elongate perpendicular to the measuring direction of the scale, for example, the feature could comprise a line on the scale). In that case, as explained in more detail below, the reference mark/imaging element might only provide a one-dimensional image. Optionally, such a feature (for providing the imaging by a pinhole effect) could comprise a reflective or a transmissive feature (e.g. line). Optionally the reference mark/imaging element comprises a single continuous omission of the otherwise generally periodic series of features in the incremental track. Such a feature (for providing the imaging by a pinhole effect) could comprise a reflective line (e.g. a line which is more reflective than the scale either side of it taken along the measuring direction) or an aperture, for example.

Optionally, the period of the incremental features is not more than 20 μm (microns), for example not more than 10 μm, for instance not more than 5 μm, for example not more than 4 μm. As will be understood, the period of the incremental signal(s) derived from the outputs of the incremental photodetector (e.g. the quadrature signals, for example the SIN and COS signals, or the "Lissajous" period), could be equal to the pitch of the scale, but not necessarily. Optionally, the period of the encoder apparatus' incremental signal(s) is not more than 10 μm, for example not more than 5 μm, for instance not more than 2 μm.

Optionally, the width of the reference mark/imaging element (measured parallel to the measuring direction of the scale) extends no more than 15% of the width of the incremental detector array (measured parallel to the measuring dimension), and preferably no more than 10% of the incremental detector array width. Optionally, the width of the reference mark/imaging element (measured parallel to the measuring direction of the scale) is not more than 150 μm (microns), for example not more than 100 μm, for instance not more than 75 μm.

As will be understood, the image formed by the imaging element will extend in at least one dimension. Optionally, the reference mark/imaging element could form a one-dimensional image of the structured light source. In other words, the reference mark could comprise a one-dimensional imaging means/member/device/element, for example an elongate pinhole, a cylindrical lens, or a one-dimensional FZP. That is, the imaging element could form an image of the structured light source in a first dimension, but not a second dimension. Said first dimension can be parallel to the measurement dimension of the scale. Such a one-dimensional imaging means/device/member/element can be advantageous as they can be simpler, cheaper and more efficient to manufacture on a scale (than a two-dimensional imaging means), especially when the reference mark is embedded within the incremental features. For example, if the imaging element is configured to image via the pinhole effect, then the reference mark/imaging element could be formed simply by missing out (or adding extra) lines which form the incremental features. Also, in the case of the reference mark comprising a FZP, the imaging means could be formed using the same process as the incremental features.

As will be understood, the light source will have structure in at least one dimension. In other words, the intensity of light emitted from the light source will vary in at least one dimension. The light source can be structured such that taken in at least one dimension, there are at least two "bright" or "illumination" regions over which light is emitted toward the scale, separated by a "dark" region over which the intensity of light emitted toward the scale is substantially less (e.g. at least 50% less than that of the illumination regions, optionally at least 75% less, for example 90% less). Optionally, no light is emitted from dark region. Preferably, there are at least three bright/illumination regions (separated by "dark" regions), optionally at least four bright/illumination regions (separated by "dark" regions). Optionally, the widths of the regions which are to be detected by the reference mark photodetector array (e.g. the widths of the bright/illumination regions, or the widths of the dark regions), parallel to measuring direction, are nominally identical. This can help with providing interleaved sets of photodetector elements (described in more detail below).

The structured light source could be described as an array of discrete, or separated, light sources. The array could be regular (e.g. even) or irregular (e.g. uneven). In other words, the (bright) elements in the array could be evenly spaced such that for all pairs of adjacent (i.e. directly adjacent) elements (e.g. bright elements) in the array the spacing between the elements is the same.

Alternatively, the (bright) elements in the array could be spaced unevenly, such that the spacing between (bright) elements of one pair of adjacent (i.e. directly adjacent) elements is different to the spacing between (bright) elements in another pair of adjacent (i.e. directly adjacent) elements.

Accordingly, as will be understood, the structured light source could be said to project a pattern (albeit not necessary a repeating pattern) or code towards the scale. In other words, the structured light source could be described as a patterned light source, or coded light source (where optionally, the pattern or code extends in at least one dimension, and optionally, only in one dimension). Optionally, said (at least) one dimension is parallel to the measuring direction of the scale.

In the case where the structured light source is described as a coded source, the value of the bits of the code projected by the coded light source could be determined by the intensity of light emitted. For example, where the light emitted by the structured light source is greater than a predetermined threshold, this could be determined as a "1", and where the light emitted by the coded light source is less than the predetermined threshold, this could be determined as a "0". Optionally, in each set of photodetector elements (described in more detail below), there is provided at least one corresponding photodetector element for each "1" bit or each "0" bit of the code. In other words, for each "1" bit (or each "0" bit) there is at least one corresponding photodetector element which is configured (e.g. placed) to detect that bit. Optionally, the code projected by the coded light does not contain any adjacent "1"s. This can help to with providing interleaved sets of photodetector elements (described in more detail below).

The structured light source could comprise a plurality of spatially separated light emitting elements. For example, the plurality of spatially separated light emitting elements could comprise a plurality of spatially separated light emitting diodes (LEDs).

As is described in WO2008/053184, the light sources and the detector elements of the readhead (e.g. the reference mark photodetector array) can be formed in the same opto-electronic chip/semiconductor compound.

Optionally, the structured light source could be provided by a mask over a single (extended) light source (e.g. a mask over a single LED). Accordingly, each of said above described "bright" or "illumination" regions could be provided by a single light emitting element such as an LED, or by transmissive region in a mask (e.g. an aperture in a mask). Optionally, the light from the structured light source is not collimated.

The reference mark photodetector array can comprise at least one set of photodetector elements for detecting the image provided by the reference mark, which are arranged to match/correlate with the structure (or pattern/code) emitted by the structured light source. As will be understood, the reference mark photodetector array could comprise a plurality of such sets of photodetector elements (e.g. at least first and second sets of photodetector elements, each for separately detecting the image provided by reference mark). As will be understood, such sets could be arranged such that as the readhead and reference mark pass each other, said image of the structed light source passes across the each of the sets of photodetector elements sequentially (i.e. rather than all of the sets detecting the image at the same time). Accordingly, the sets can be offset relative to each other at least in a dimension parallel the measuring direction of the scale. Optionally, the sets of photodetector elements are interleaved.

The reference mark photodetector array could comprise a continuous series of photodetector elements (in other words a regular array of photodetector elements), wherein select elements within the continuous series (regular array) are used to form a set (i.e. the above mentioned at least one set of photodetector elements). For example, only some of the elements could be used to contribute to the signal used to detect the reference mark.

Optionally, the reference mark photodetector array comprises a non-continuous series of photodetector elements (for example, an irregular/interrupted/uneven array of photodetector elements). For example, the elements within a set could be spaced apart such that photodetector elements are placed/provided only at locations where it is expected that the relatively bright parts (or relatively dark parts) of the at least one image of the structured light source will fall so as to provide a positive (or negative) pulse as the readhead passes the reference mark. Accordingly, in the embodiment in which the reference mark provides only a single image of the structured light source, the reference mark photodetector array could comprise a set of photodetector elements spaced apart from each other in an arrangement which correlates (e.g. matches, either negatively or positively) with the structured light pattern as imaged by the reference mark.

Accordingly, in either case (i.e. in the cases of a continuous or non-continuous series of photodetector elements), the reference mark photodetector array could comprise at least one set of photodetector elements, wherein the elements are spaced apart from each other in an arrangement (e.g. "pattern") which correlates/corresponds with the arrangement (e.g. "pattern") of the structured light source as imaged by the reference mark, and optionally which correlates/corresponds with the arrangement (e.g. "pattern") of the structured light source. In other words, the detector can comprise an array of elements for detecting the structure of the structured light source, which are arranged/positioned in a formation correlating with/corresponding to the structure of the structured light source. As will be understood, correlating/corresponding includes a matching arrangement which is a spatially inverted (e.g. back-to-front and/or upside-down) version (or even a negative version) of the structured light source.

The structure/pattern of the photodetector elements which are for detecting the reference mark can be the same as that of the structured light source. The structure/pattern of the plurality of photodetector elements for detecting the reference mark could be the same, but inverse of the pattern of the structured light source (because as explained above, the image formed by the reference mark is an inverse representation of the structured light source, and this inverse representation could be what falls on the reference mark photodetector array).

Accordingly, the encoder apparatus can be configured such that as the readhead passes through the field of view of the reference mark, the at least one image of the structured light source sweeps across the reference mark photodetector array. This could be such that at a certain relative position of the scale and readhead (e.g. at the reference position), there is a high correlation between the at least one image and the plurality of photodetector elements for detecting the reference mark, resulting in a signal peak. As will be understood, the at least one image of the structured light source could sweep across the reference mark photodetector array in a direction opposite to the direction of relative travel of the readhead and scale.

As will be understood, the readhead can comprise at least one incremental photodetector, for example an incremental photodetector array. Light from a light source can interact with the incremental scale track to form a resultant field which is detected by the incremental photodetector. The resultant field could comprise an interference fringe. Optionally, the readhead comprises at least one grating (e.g. a diffraction grating) which is used in the formation of the resultant field (e.g. the interference fringe/fringe field). The at least one (e.g. diffraction) grating could be located before the scale (e.g. so as to interact with the light (e.g. to diffract light) from the structured light source before it reaches the scale). The at least one (e.g. diffraction) grating could be located after the scale (e.g. so as to interact with light (e.g. to diffract light) that has been reflected/transmitted by the scale). Optionally, the readhead comprises at least one (e.g. diffraction) grating before the scale and at least one (e.g. diffraction) grating after the scale. Gratings other than diffraction gratings can be provided in the readhead. For example, a sampling grating could be provided, for example over a detector, such as over an incremental photodetector array.

Optionally, the encoder is configured such that at least part of the structured light source provides the light which interacts with the incremental scale track to form a resultant field. For example, in the case in which the structured light source comprises a plurality of individual light sources, then preferably the light from at least one, and optionally the light from all, of said individual light sources can be configured to form said resultant light field.

Accordingly, optionally, the structured light source is configured to illuminate the incremental and the reference mark features on the scale. Optionally, the structured light source is configured to generate both the incremental and reference mark signals detected by the readhead. For example, the structured light source can be configured to illuminate the reference mark photodetector and for producing a resultant field (for example a fringe field) at a photodetector for detecting an incremental change in position of the readhead relative to the scale.

Using the same structured light source in this way allows for a high efficiency measurement encoder. The use of the same structured light source can also reduce complexity of the encoder and simplify manufacture, particularly the manufacture of the readhead. Further, by using the same light source to illuminate both the incremental and the reference mark photodetector arrays the amount of background illumination on the incremental photodetector array can be reduced as there is no separate light source for illuminating the reference mark photodetector array, this can mean a more favourable signal to noise ratio in the signal fed to a signal amplifier(s), which can allow a greater degree of discrimination in the signal from the signal amplifier(s).

A grating (e.g. a diffraction grating) may be provided over (e.g. directly mounted on) the structured light source in order to cause light from the structured light source to diffract before it reaches the scale. Accordingly, for example, a (diffraction) grating may be provided on at least one of the illumination areas of the structured light source, optionally all of the illumination areas of the structured light source. In such an arrangement, the grating causes the light from the structured light source to form a resultant field (e.g. an interference fringe) at an incremental photodetector for detecting relative movement of the readhead and scale. Optionally, the (diffraction) grating is an amplitude grating.

The reference mark could comprise more than one imaging element. Optionally, the reference mark could comprise two imaging elements which image the structured light source and which are provided near to each other on the scale (for example, by not more than a distance equal to 50% of the width of the structured light source, measured parallel to the measuring dimension). As will be understood, in this case, the pattern/code detected by the readhead, at the reference position will not be the same as that of the structured light source. Rather, the pattern/code detected by the readhead at the reference position, will be some combination of the two or more images formed by each of the imaging elements.

Optionally, the photodetector elements of the reference mark photodetector array are sized and/or spaced so as to be insensitive to the phase of the fringe field. This may be achieved by photodetector elements of the reference mark photodetector array having a lateral extent in a measurement direction being an integer multiple of the fringe field pitch at the reference mark photodetector array, and/or by the centres of photodetector elements of the reference mark photodetector array being spaced apart in a measurement direction being an integer multiple of the fringe field pitch at the reference mark photodetector array. Such an arrangement can allow the reference mark photodetector array to be unaffected by the particular phasing of a fringe field illumination pattern which is generated by the measurement encoder device.

As will be understood, the encoder apparatus could be configured to derive from the output of the reference mark photodetector array at least one signal which is used to determine the presence of the at least one reference mark. Said at least one signal can comprise a main lobe and side lobes which occur as the readhead passes over the reference mark. The encoder apparatus can be configured such that the magnitude of the side lobes is no greater than 75% of the magnitude of the main lobe, optionally no more than 50% of the magnitude of the main lobe, for example no more than 35% of the magnitude of the main lobe. Optionally, said at least one signal (which is used to determine the presence of the at least one reference mark) is derived from at least two sets of photodetector elements. For example, the encoder apparatus could be configured to derive at least one "gate"/ "window" signal and/or "zero-point crossing" signal from at least two sets of photodetector elements.

Said at least one signal (which is used to determine the presence of the at least one reference mark) (for example a reference mark zero-point crossing signal) may be determined based on output from at least two elements of the reference mark photodetector array (e.g. from the output of at least two sets of reference mark photodetector elements). Optionally said at least one signal (which is used to determine the presence of the at least one reference mark) (for example the reference mark zero-point crossing signal) may be determined based on output from four elements of the reference mark photodetector array (e.g. from the output of four sets of reference mark photodetector elements). The said at least one signal (which is used to determine the presence of the at least one reference mark) (for example the reference mark zero-point crossing signal) may be determined based on output from more than four elements of the reference mark photodetector array (e.g. from the output of more than four sets of reference mark photodetector elements). In use, based on the output of at least two, three, four, or more of the elements of the reference mark photodetector array (e.g. from the output of at least two, three, four, or more sets of reference mark photodetector elements), the measurement encoder may monitor for the reference mark zero-point crossing.

Optionally the reference mark is embedded within the incremental track. This can allow for a more compact scale, and also may allow for better efficiency.

The scale may be a phase scale. The scale may be an amplitude scale.

Also disclosed is a measurement encoder comprising a scale and a readhead, the scale comprising a reference mark and a periodic series of marks forming an incremental track, the readhead comprising an incremental photodetector array and a reference mark photodetector array, wherein the readhead further comprises a structured light source, the reference mark photodetector array comprising elements arranged to correspond to the code of the structured light source, so that, in use, a fringe field is formed for monitoring incremental position, and also such that a change in illumination of the reference mark photodetector array occurs when the readhead travels through a predetermined position relative to the scale corresponding to the reference mark.

According to another aspect of the invention there is provided an incremental encoder comprising a scale and a readhead, the scale comprising a periodic series of features defining an incremental scale, and at least one reference mark, the readhead comprising a light source for illuminating the scale, and a detector for detecting the reference mark, in which:

- the light source is structured in that it comprises in at least one dimension an array/arrangement of relatively (alternating) light and dark regions, (e.g. such that there are at least two separated light regions);
- the reference mark is configured such that when the readhead and scale are aligned at a reference mark position, it is configured to project/replicate the structure of the light source toward the reference mark detector (in particular, it projects a spatially inverted version of the light source toward the reference mark detector); and
- the detector for detecting the reference mark comprises an array of elements for detecting the structure, such that when the readhead and reference mark are aligned at the reference mark position, an intensity pulse is provided at the array of elements (in particular, the detector comprises an array of elements for detecting the structure which are arranged/positioned in a formation corresponding to the structure of the structured light source).

As will be understood, the features described above in connection with the other aspects of the invention are equally applicable to this aspect of the invention, and vice versa.

As will be understood, such light and dark regions can be provided (for example) by an arrangement of light emitting elements (e.g. LEDs) spaced apart from each other in the at least one dimension. Such light and dark regions can be provided (for example) by a mask between at least one light emitting element and the scale. For example, the mask can have an arrangement of bright and dark portions, wherein "bright" portions permit a relatively higher amount of light to propagate toward the scale than the "dark" portions. For example, the "dark" portions could substantially block light from propagating toward the scale.

The light regions can comprise a region from which light is emitted toward the scale, and in which the dark regions comprise the absence of a light emitting element.

In which a grating is provided over one or more of the light regions (and for example over all of the light regions).

According to a further aspect of the invention there is provided an incremental measurement encoder comprising a scale and a readhead, the scale comprising a periodic series of features forming an incremental track and at least one reference mark, the readhead comprising a light source and a reference mark photodetector array, wherein the readhead can detect when the readhead is in a reference mark position relative to the scale to within a unit of resolution of the incremental measurement encoder. Optionally detection of when the readhead is in the reference mark position relative to the scale comprises forming at least one image of the light source on the reference mark photodetector. The light source may be a structured light source.

Embodiments of the invention will now be described in greater detail, by way of example only, and with reference to the following drawings, wherein.

Figure 1:
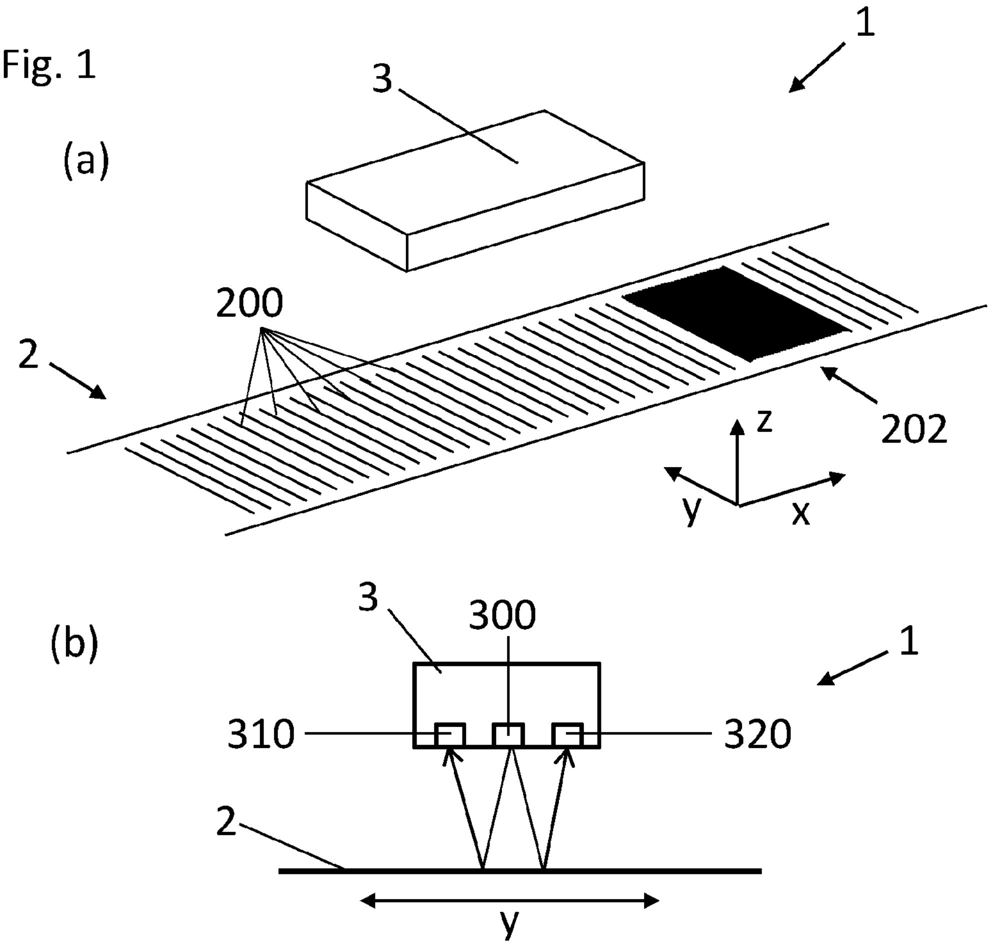
FIG. 1 shows an incremental measurement encoder according to one embodiment of the present invention.
Figure 4:
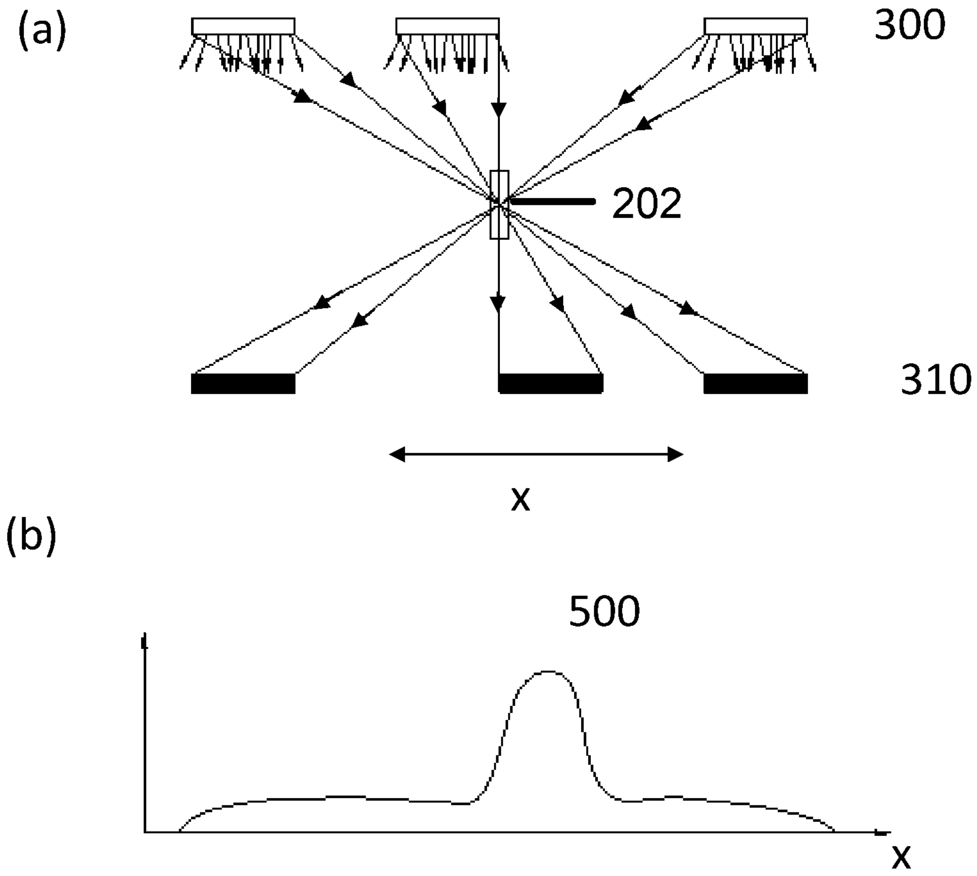
Figure 5:
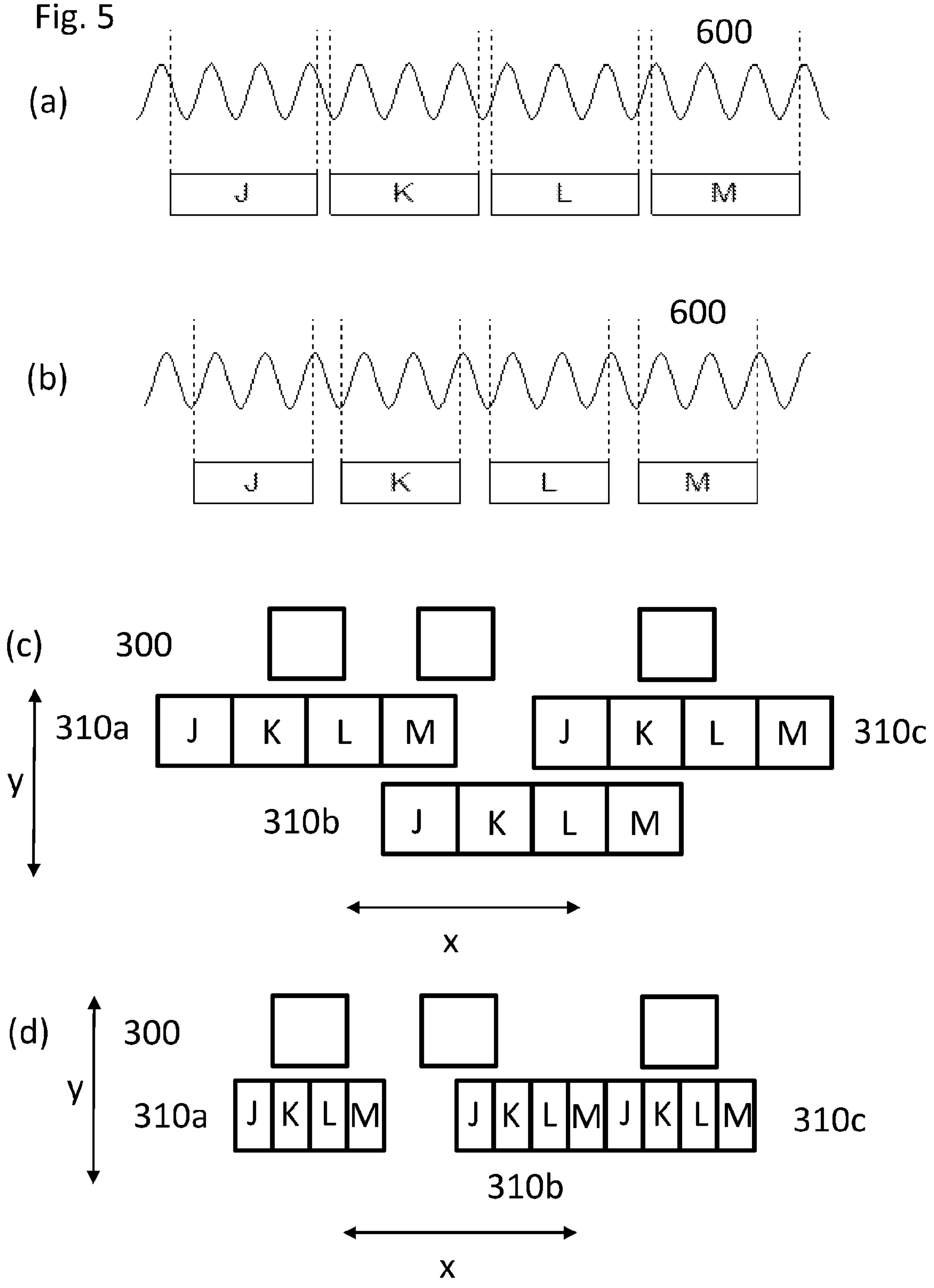
Figure 6:
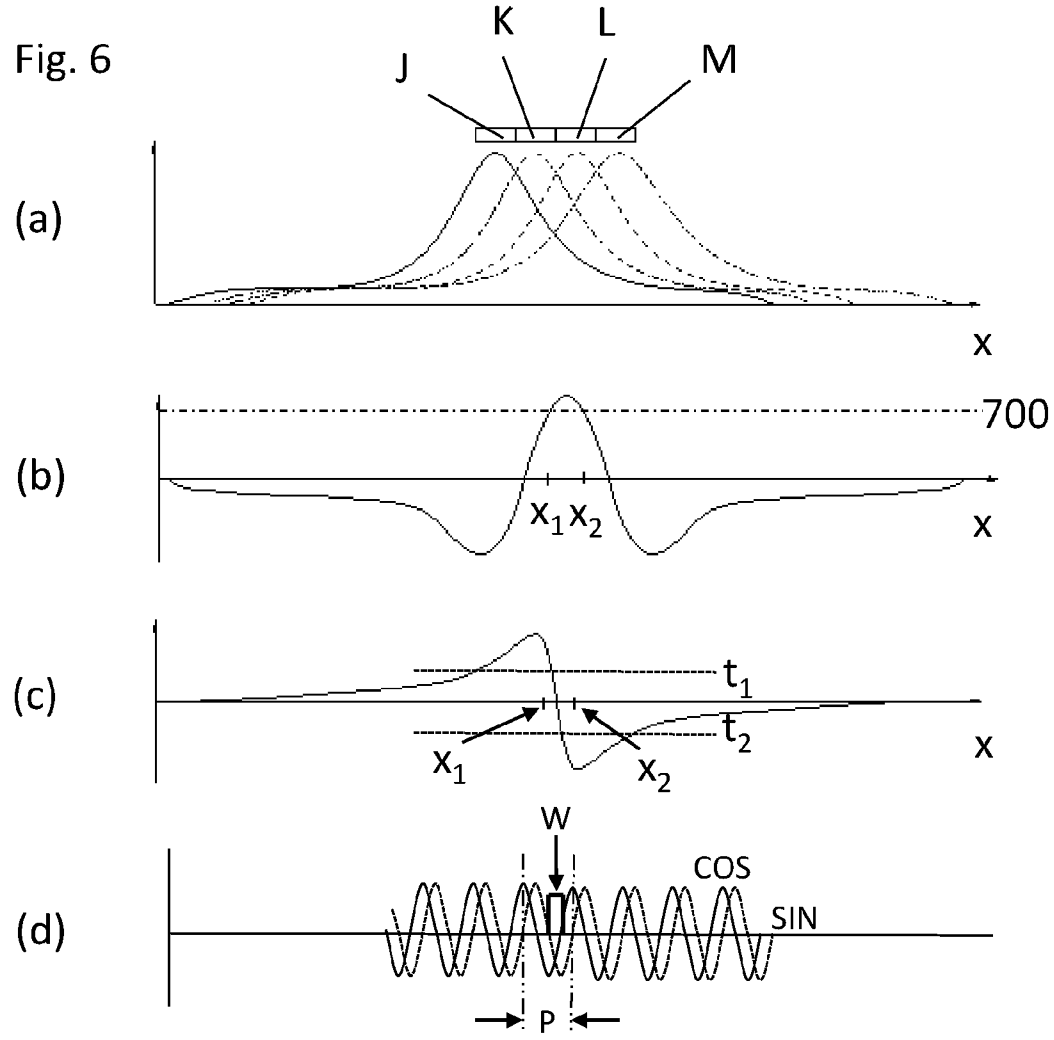
Figure 7:
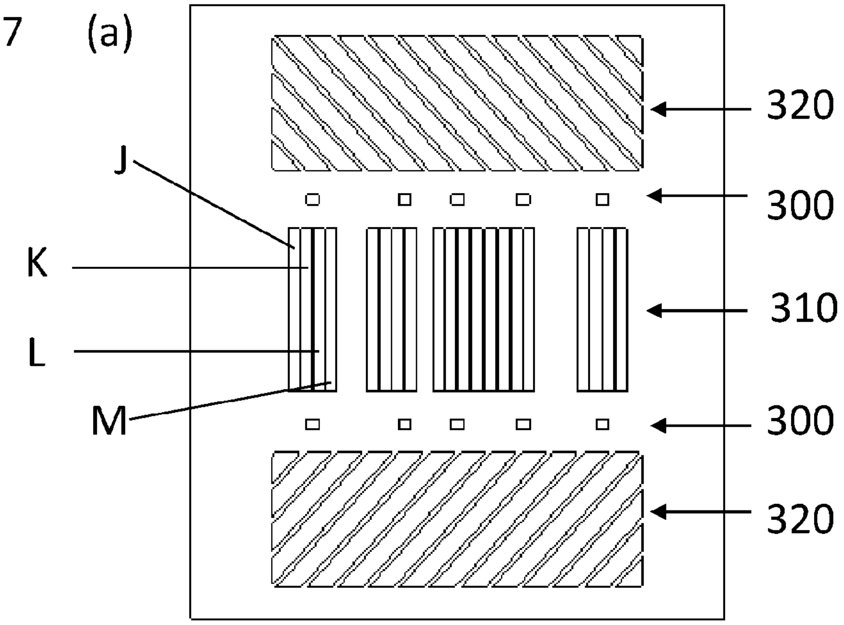
Figure 7:
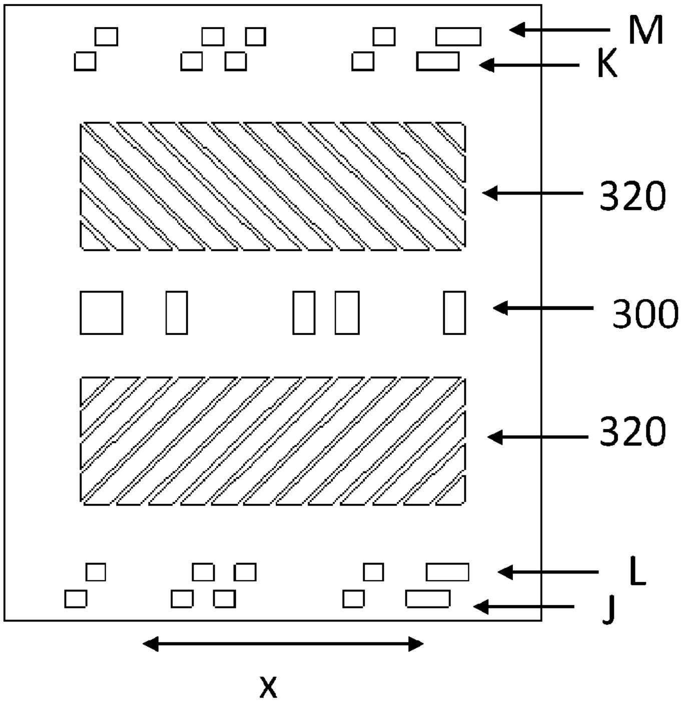
Figure 7:
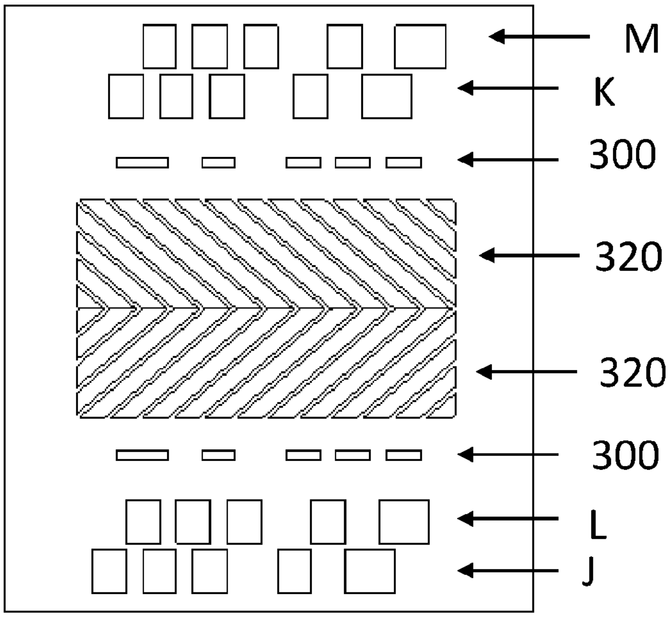
Figure 8:
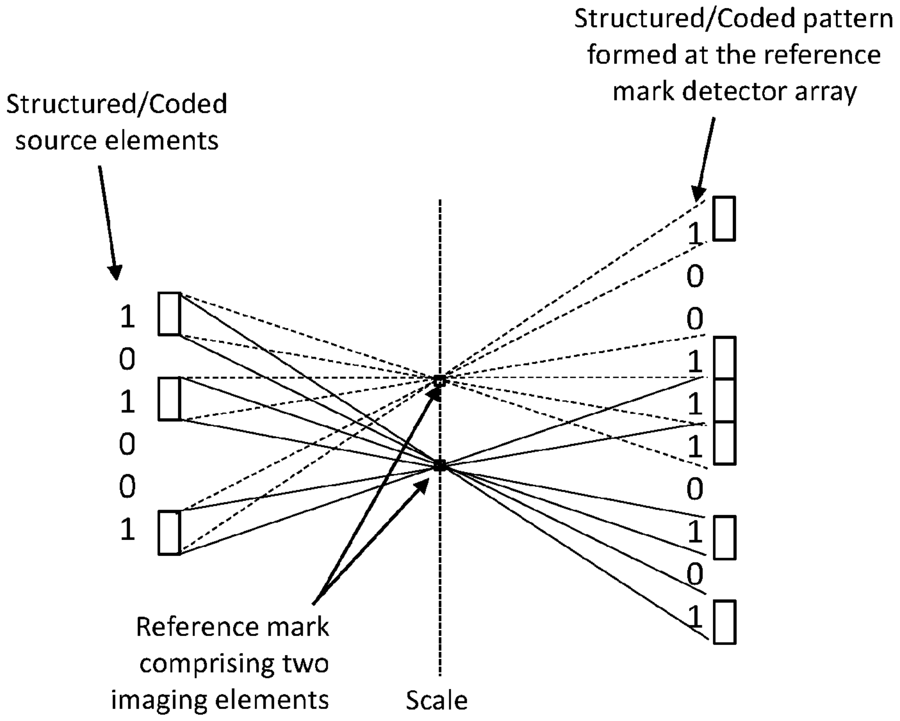
Figure 9A:
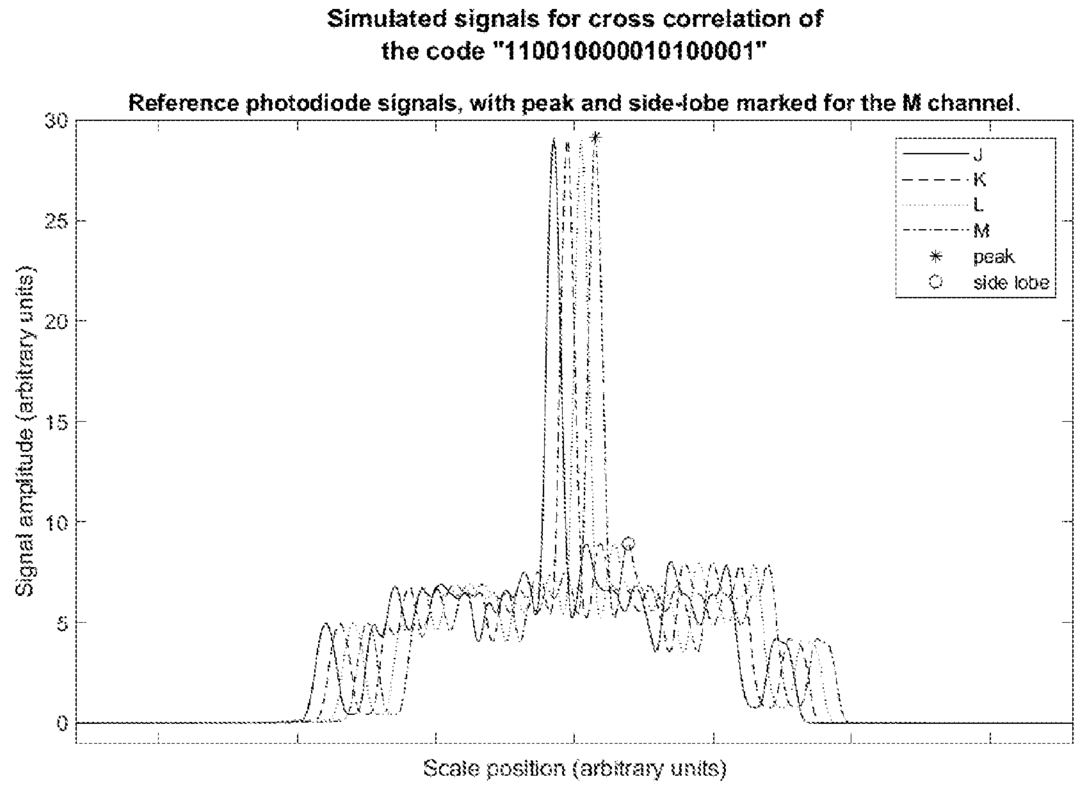
Figure 9B:
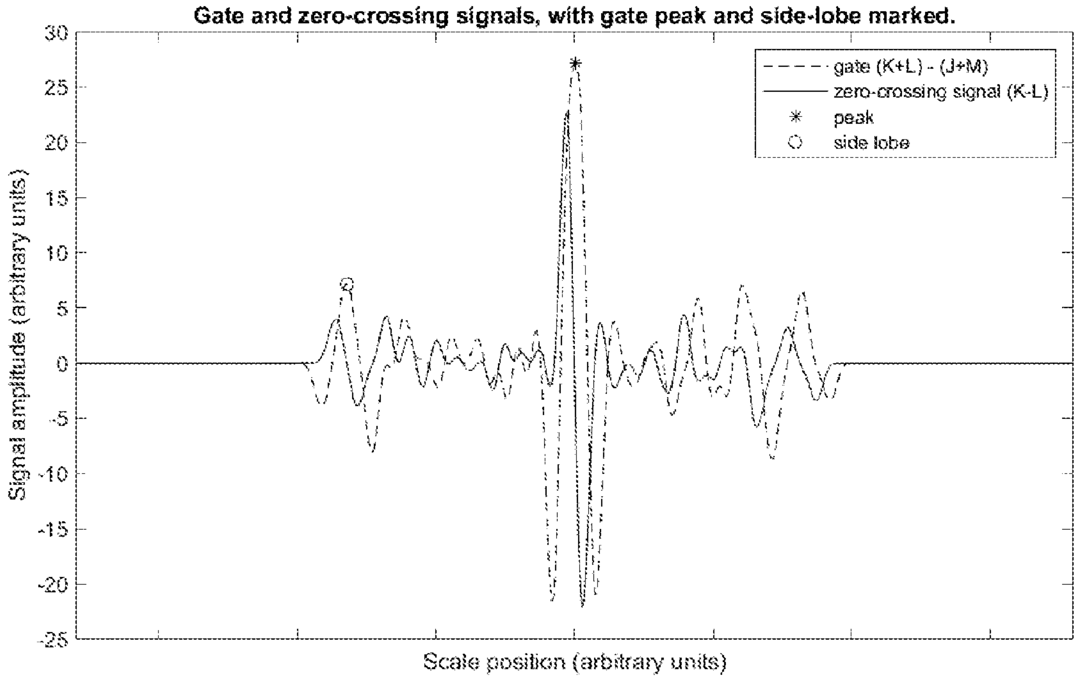

FIG. 4 schematically shows the readhead in a position relative to the scale corresponding to the reference mark;

FIG. 5 shows the spacing of elements of the reference mark photodetector;

FIG. 6 shows the processing of the signals output from the reference mark photodetector to determine a reference mark signal;

FIG. 7 shows arrangements of components for part of the readhead shown in FIG. 1;

FIG. 8 schematically shows an embodiment in which the reference mark comprises more than one imaging element; and FIG. 9(*a*) is a graph illustrating the side lobes present on the outputs of each of the sets of the reference mark photodetector elements (J, K, L and M); and FIG. 9(*b*) is a graph illustrating the side lobes present on the gate and zero-point crossing signals which are derived from the outputs of the sets of the reference mark photodetector elements (J, K, L and M).

FIG. 1 shows a first embodiment of a measurement encoder 1 according to the invention comprising a scale 2 and a readhead 3. In use, the scale 2 and readhead 3 are fixed to relatively movable parts of a machine or machines and the measurement encoder 1 allows the relative positions of the two parts to be determined.

In the embodiment shown in FIG. 1, the measurement encoder 1 is a linear measurement encoder for measuring the position of the readhead 3 relative to the scale 2 in a first direction x as indicated in the figure.

The scale 2 is an elongate scale having a series of periodic marks 200 thereon which define an incremental track. In this embodiment, the periodic marks form a phase grating on the scale which can cause, when illuminated a fringe field pattern to be formed by light reflected therefrom. Also forming part of the scale is a reference mark 202, which in this embodiment is embedded in the incremental track. In this embodiment, the incremental track comprises 4 μm (microns) pitch scale, and the reference mark 202 extends a distance of 100 μm in the measurement direction (x).

FIG. 1(*b*) shows a cross section through the measurement encoder of FIG. 1(*a*) through a plane orthogonal to the measurement direction x.

Figure 2:
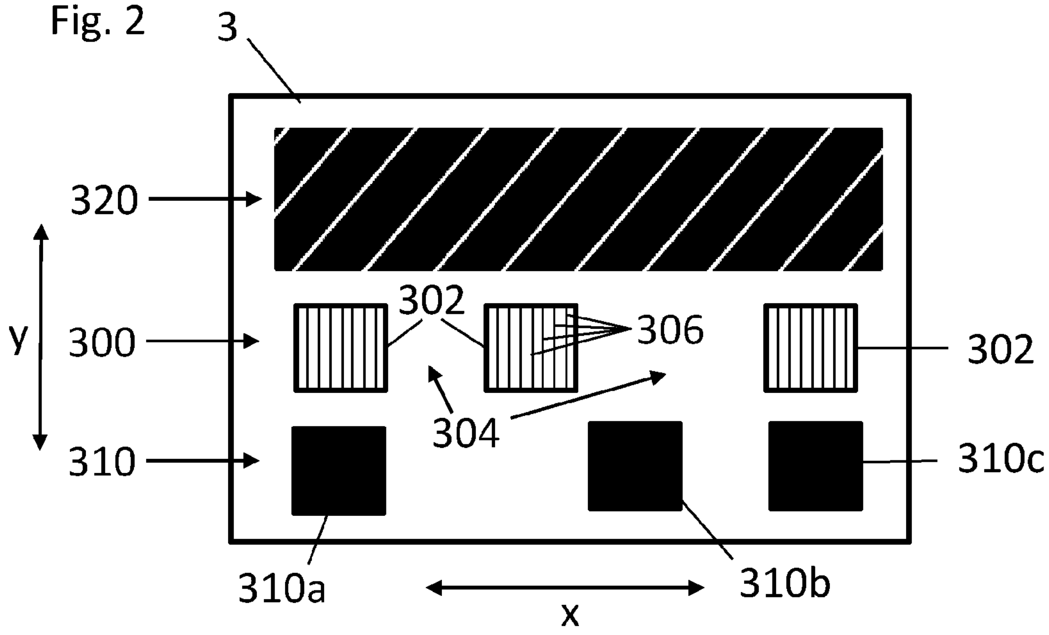
FIG. 2 shows an arrangement of components for part of the readhead shown in FIG. 1.

FIG. 2 shows the arrangement of light emitting and light receiving components of the readhead 3 for the embodiment shown in FIG. 1. The components of the readhead 3 face the scale 2. In particular, the readhead 3 comprises a structured light source 300, in this embodiment made up of three individual light sources 302 (i.e. "light" or "illuminating" regions) which are spaced apart by spaces 304 (i.e. "dark" regions). As will be described in more detail below, due to the uneven spacing of the individual light sources 302, the structured light source 300 shown in FIG. 2 could be said to correspond to the code 101001 when read from left to right. In this embodiment, the individual light sources 302 are provided with a grating (which is this particular embodiment is a diffraction grating). In particular, each individual light source 302 has a grating formed from individual elements 306 formed directly on the individual light sources 302. The grating causes the structured light source to form an interference fringe field.

FIG. 2 also shows a reference mark photodetector array 310. The reference mark photodetector array comprises three parts which correspond to the three individual light sources 302 of the structured light source 300. The parts of the reference mark photodetector array 310 are arranged on the readhead 3 in a mirror image (in other words, spatially inverted) configuration of the individual light sources 302 of the structured light source. As will be explained in more detail the parts of the reference mark photodetector array and the space therebetween could be said to form the code 100101 (which is the spatially inverse of the above mentioned code of the structured light source). The embodiment of FIG. 2 shows the reference mark photodetector array 310 comprising three parts/photodetectors 310*a*, 310*b*, 310*c*.

An incremental photodetector array 320 is also shown as part of the readhead 3. An example of a suitable incremental photodetector array is described in WO 2008/053184 A1. The incremental photodetector 320 detects the changes in intensity of the fringe field (for example an interference fringe) falling thereon. In this embodiment, the fringe field of the light falling on the incremental photodetector array 320 is created by the wavefronts of light emitted from the structured light source 300 interacting with the grating formed by elements 306 and subsequently interacting with a second grating, in this case being the incremental track made up of periodic marks 200. This forms a fringe field (e.g. an interference fringe) on the incremental photodetector array. Relative movement of the scale and readhead causes the fringe field across the incremental photodetector to change (e.g. move), such change/movement being detectable by the readhead and, for example, used to increment/decrement a count of the relative position. As will be understood, it is possible to determine incremental measurement using a resultant field other than a fringe field. For example, light from the source can used to generate (e.g. via the scale, and optionally one or more diffraction gratings in the readhead) spots which modulate (e.g. change in intensity) with relative movement of the scale and readhead. Such an encoder is, for example, described in U.S. Pat. No. 6,198,534.

As will be understood, the signals from the incremental photodetector array can be used to produce one or more incremental measurement signals (e.g. quadrature signals, e.g. SIN and COS signals). Such incremental measurement signals enable an incremental count of the relative position of the scale and readhead to be measured. Such incremental measurement (e.g. quadrature) signals can be interpolated to provide a higher resolution of count/measurement. As will be understood, an incremental encoder apparatus will have a given/specified unit of resolution. Preferably, the reference mark pulse detected by the reference mark photodetector array (e.g. by a set of photodetector elements) enables the reference mark position to be repeatably determined to within a unit of resolution of the incremental measurement, in other words, such that the reference position signal determined/output by the encoder apparatus is repeatable within a unit of resolution of the incremental measurement. As will be understood, this can mean such that the reference position signal determined/output by the encoder apparatus is provided at the same position, within a unit of resolution of the incremental measurement, regardless of the relative direction of motion.

For example, the output from the reference mark photodetector array can be used to determine a "gate" or "window" signal during which a reference position signal is determined/output by the encoder apparatus when a predetermined instance in the cycle of the incremental signal occurs (e.g. when the quadrature signals are both negative and equal). Accordingly, it can be important for the "gate" or "window" signal to be no wider than one cycle of the incremental signal (e.g. one period of the quadrature/SIN signal) to avoid ambiguity. The narrower the reference mark pulse detected by the readhead (e.g. the narrower the "pulse" of light on the detector), the narrower the "gate" or "window" signal which can be determined from the reference mark photodetector's signals. The use of "gate" or "window" signals to determine the presence of a reference mark are well known, and for example described in more detail in International Applications published under the Patent Cooperation Treaty WO2017/203210 and WO2007/057645, as well as described in more detail below. Our inventors have found that providing a structured light source, which is imaged onto a photodetector array, can enable a narrower reference mark pulse to fall on the detector, which in turn can help to ensure the repeatability of the reference mark signal provided by the encoder, to within a unit resolution of the incremental encoder.

The embodiment shown in FIGS. 1 and 2 will be understood to be a reflective measurement encoder as the light source (here the structured light source 300) and the photodetector arrays (here reference mark photodetector array 310 and incremental photodetector array 320) are located on the same side of the scale 2 in use.

Figure 3:
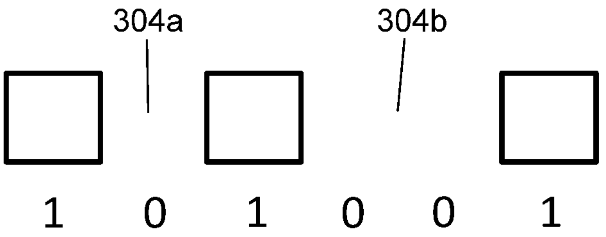
FIG. 3 shows an example of a structured light source which forms part of the readhead of FIG. 1.

FIG. 3 shows a structured light source 300 used in the embodiments of FIG. 1. FIG. 3 shows the structured light source having the code 101001 as is used in the embodiment shown in FIG. 2. Here an individual light source 302 of a given width represents "1" while a space of a given width represents "0". Here it can be seen that a first space 304*a* (when reading from left to right) has a width equal to a first individual light source 302*a* while a second space 304*b* has a width equal to twice the width of the first space 304*a*. In this embodiment space 304*b* represents "00". Other example possible codes for the structured light source include the code 10000001000100001000001 with the individual light sources representing "1" while spaces represent "0"s, with the width of the spaces compared to the individual light sources determining the number of "0"s. 110010000010100001 is an example of another code that could be used. It will be appreciated that in this structure the left most individual light source will double the width of the other individual light sources, because here one individual light source (the width of which is twice the given width) represents "11" within the code. Such an individual light source could be a single continuous light source or be made up of adjacent separate adjacent light sources. The code 111001100011011011 could also be used in embodiments. In other embodiments the structured light source may be a Barker code. It will be appreciated, that as was described above in relation to the embodiment shown in FIG. 2 having an individual light source having the code shown in FIG. 3, the reference mark photodetector array 310 is configured to correspond to the structured light source 300, and may be the mirror image (e.g. spatially inverted version) of the structured light source 300.

The reference mark photodetector array 310 arranged as the mirror images of the above described structured light source 300 codes are 100101 (for 101001 shown in FIG. 3), 10000010000100010000001 (for the code 10000001000100001000001), 100001010000010011 (for the code 110010000010100001), and 110110110001100111 (for the code 111001100011011011).

While FIG. 1 and FIG. 2 describe a reflective embodiment, it will be understood that other arrangements may be possible, for example the reference mark photodetector array may be located on the opposite side of scale 2 to the structured light source 300, such a system may be referred to as a transmissive system.

FIG. 4(*a*) schematically shows the light path from the structured source 300 to the reference mark photodetector array 310 for a transmissive system. It will be understood that with the exception of reflection/transmission of the light through the scale 2 at the reference mark 202, the underlying principles are the same for the reflective embodiment of FIGS. 1 and 2 and the transmissive embodiment of FIG. 4(*a*). For ease of explanation, the transmissive embodiment of FIG. 4(*a*) will now be described.

In FIG. 4(*a*) the readhead 3 is shown in a position relative to the scale 2 corresponding to a reference mark position. The structured light source 300 is shown on one side of the reference mark 202 and the reference mark photodetector 310 is shown on the opposite side of the reference mark 202. Both the structured light source 300 and the reference mark photodetector array 310 form part of the readhead 3 with the reference mark photodetector array 310 being located on a surface of the readhead 3. The structured light source 300 and the reference mark photodetector array 310 maintain a fixed relationship to each other and can be moved in a movement direction x relative to the scale 2. As the readhead 3 moves relative to the scale 2, the readhead will also move relative to the reference mark 202. In this embodiment, the reference mark 202 in the scale 2 allows light to be transmitted therethrough and acts as an imaging element; in particular the reference mark comprises a feature which images the structured light source 300 onto the photodetector array 310 by a pinhole effect. The transmitted light forms an image of the structured light source 300 on a plane containing the surface on which the reference mark photodetector array 310 is located. When the readhead 3 is in a position corresponding to the reference mark 202 relative to the scale 2 then the image formed is a spatially inverted representation of the code of the structured light source 300. As the reference mark photodetector array 310 is configured to be a spatially inverted representation of the structured light source in this embodiment, when the readhead 3 is in the position corresponding to the reference mark 202 relative to the scale 2, the reference mark photodetector array 310 is illuminated to its fullest extent by the structured light source 300. The reference mark photodetector array 310 is configured to output a signal based on the amount of light falling thereon.

As will be understood, in other embodiments, the imaging element of the reference mark could comprise a lens (e.g. cylindrical lens) and/or a diffractive optical element (such as a Fresnel Zone Plate). As will also be understood, the term imaging can mean the convolution of the structure/pattern of light emitted by the structured light source with the optical impulse response, or point spread function, of the reference mark. Likewise, the term image can refer to the pattern of light formed at the reference mark detectors by this process.

FIG. 4(*b*) shows how the output of the reference mark photodetector array 310 may vary as the readhead 3 and scale 2 are moved relative to each other in the measurement direction x. As can be seen in FIG. 4(*b*) a pulse 500 is formed in the output of the reference mark photo detector array 310 when the readhead 3 is in and around the reference mark position relative to the scale 2. It is possible to vary the relative proportions of the pulse 500 by adjustments to the reference mark 202. For example, widening the reference mark allows more light to be transmitted through the scale in a transmissive system and so increases the intensity of the peak, conversely narrowing the reference mark 202 allows less light to be transmitted though the scale and so diminishes the intensity of the pulse 500. However, widening the reference mark 202 will also cause the pulse 500 to become broader and also will disrupt the incremental signal more. Other factors such as the perpendicular distance of the structured light source 300 from the scale (i.e. along the z-axis shown in FIG. 1) can also affect the intensity of the light reaching the reference mark photodetector array 310. Advantageously, the intensity/amplitude of the pulse 500 can be increased without increasing the width of the pulse 500, by increasing the number of "bright" regions in the structured light source; thereby helping to provide a more distinct pulse. Accordingly, using a structured light source which is imaged by the reference mark can be particularly useful when trying to provide a small reference mark, whilst still obtaining a distinct pulse at the detector.

It will be appreciated that in the described transmissive arrangement the light wavefronts emitted from the structured light source 300 interact with the grating comprising elements 306 directly on the structured light source 300 and subsequently interact with the scale 2 (as is described above in relation to the incremental track formed from the periodic marks 200). As the light passes through reference mark 202, the fringe field formed due to the elements 306 is formed on the parts 310*a*, 310*b*, 310*c* of the reference mark photodetector array 310.

In some embodiments, the parts 310*a*, 310*b*, 310*c* may comprise more than one section/element. For example, each of the parts 310*a*, 310*b*, 310*c* may be formed of four sections/elements J, K, L, M. In such an embodiment reference mark photodetector array 310 comprises three quad cells 310*a*, 310*b*, 310*c*. For example, each of parts 310*a*, 310*b* and 310*c* can be seen to be made up of four sections J, K, L, M. As will be understood, the same section in the three parts form a set of photodetector elements, which are spaced in a manner to match/correlate with the structured light source. For example, all of the J sections are spaced a manner to match/correlate with the structured light source, and so are all of the K sections, L sections and M sections. The J sections form a first set of photodetector elements, the K sections form a second set, the L sections a third set, and the M sections a fourth set. The outputs from these sets can be combined to aid determination of the reference mark position, as described in more detail below in connection with FIG. 6.

FIG. 5(*a*) shows a first way in which a part 310*a* of the reference mark photodetector array 310 comprises a quad cell having four sections J, K, L, M may be configured in order to be insensitive to the fringe field formed thereon. FIG. 5(*a*) shows the intensity of the fringe field 600 formed at the reference mark photodetector. As can be seen, each section J, K, L, M of the illustrated quad cell has a width which is an integer multiple of the period of the fringe field. The figure also shows each finger J, K, L, M as being the same width.

FIG. 5(*b*) shows a first way in which a part 310*a* of the reference mark photodetector array 310 comprises a quad cell having four sections J, K, L, M may be configured in order to be insensitive to the fringe field formed thereon. FIG. 5(*b*) shows the intensity of the fringe field 600 formed at the reference mark photodetector. As can be seen, each section J, K, L, M of the quad cell has the same width and the distance between the centres of adjacent fingers J, K, L, M is an integer multiple of the fringe field.

Depending on the configuration of the structured source elements and/or reference mark photodetector element size the JKLM detectors may or may not be able to be partially or even fully interleaved (e.g. because the gaps between the sources are large enough to place the four detectors needed for each element where the signal is detected). If the gaps between source elements are not large enough (and/or the desired size of reference mark photodetector elements are too large) such that it is not possible to fit all four elements where the signals are detected, then the detectors can be placed in two or more adjacent tracks as required. Fully interleaved detectors are advantageous because they are an efficient use of expensive semiconductor area. Non-interleaved detectors in adjacent tracks are advantageous in that they offer more freedom to choose any desirable code pattern, and can allow larger detector areas giving bigger, lower noise signals, at the cost of requiring more semiconductor area. FIG. 5(*c*) (and also FIGS. 7(*b*) and 7(*c*)) shows a schematic embodiment in which the detectors are non-interleaved, and FIG. 5(*d*) (and also FIG. 7(*a*)) shows a schematic embodiment in which the detectors are interleaved.

FIG. 6(*a*) shows the signals from each section J, K, L, M of the quad cell 310*a* of the reference mark photodetector array 310 as the readhead 3 moves relative to the scale 2 along the measurement direction x. In order to identify when the readhead 3 is a position relative to the scale 2 which corresponds to the reference mark 202, the signals from each section of the quad cell are processed. In particular, as is already known in the field of encoders, so-called "gate" and "zero-point crossing" signals (also known as "sum" and "diff" signals) are derived, which are analysed to determine the presence of a reference mark. FIG. 6(*b*) shows the signals from the sections J, K, L, M of the quad cell of FIG. 6(*a*) combined according to equation (1), so as to provide the "gate" or "sum" signal.

$$(K+L)-(J+M) \tag{1}$$

FIG. 6(*b*) also shows a threshold 700. The output from equation (1) is used as a gate signal to enable a zero-crossing detector. When the gate signal is above the threshold 700, here between the points $x_1$ and $x_2$, the zero-crossing detector is activated. The zero-crossing detector processes the signals of the sections of the quad cell according to equation (2a), to obtain a "zero-point crossing" signal, the output of which is shown in FIG. 6(*c*).

$$K-L \tag{2a}$$

In other embodiments the zero-crossing detector could process the signals of the quad cell according to equation (2b).

$$(J+K)-(L+M) \tag{2b}$$

FIG. 6(*c*) also shows the positions $x_1$ and $x_2$ between which the zero-crossing detector is activated. In one embodiment, the encoder apparatus could be configured such that when the output of the of the zero-crossing detector is 0 (i.e. it crosses "0"), it is determined that the readhead 3 is in the position relative to the scale 2 corresponding to the reference mark 202, and therefore a reference mark signal is output by the readhead. However, alternative embodiments are possible. For example, an additional pair of thresholds (e.g. $t_1$, $t_2$) could be used to analyse the zero-point crossing (or ""diff") signal, such that when the zero-point crossing (or "diff") signal is between those thresholds, a window W signal is generated which in turn is used to analyse the incremental SIN and COS signals (W, SIN and COS are schematically shown superimposed in FIG. 6(*d*). In particular, this window W can be used such that a reference mark signal is output by the encoder apparatus when, within such window W, it is determined that the SIN and/or COS signals meet a particular predetermined condition (e.g. when it is determined that the SIN and COS signals are equal and negative). As will be understood, such window signal W needs to be sufficiently narrow so that such predetermined condition of the SIN and COS signals only occurs once within the window W, thereby ensuring that the reference mark is repeatable to within one unit resolution of the encoder apparatus.

FIG. 9(*a*) is similar to FIG. 6(*a*) in that it shows the signals from each section J, K, L, M of the quad cell 310*a* of the reference mark photodetector array 310 as the readhead 3 moves relative to the scale 2 along the measurement direction x. However, it illustrates that in reality the signals are likely to comprise sidelobes as well as the main lobe. FIG. 9(*b*) also illustrates how that these sidelobes are still present on the so-called gate (or "sum") and zero-point crossing (or "diff") signals (e.g. the signal derived from the outputs of the sets of reference mark photodetector elements). Such sidelobes can adversely affect the processing of these signals, especially if their magnitude is too large. For a given optical system, the "code" or pattern of the structured light source can have an effect on the magnitude of the side lobes. Accordingly, it has been found that by choosing an appropriate code, it is possible to configure the encoder apparatus such that in the signals derived from the outputs of the sets of reference mark photodetector elements (e.g. in the so-called "gate" and/or "zero-point crossing" signals) the magnitude of the most significant sidelobe is not more than 75% of the magnitude of the main lobe. In the embodiment simulated in FIG. 9 (where the light source has the code 110010000010100001), the magnitude of the most significant sidelobe is less than 30% of the magnitude of the main lobe.

FIG. 7(*a*) shows an alternative component geometry to that shown in FIG. 2. In this embodiment each part of the reference mark photodetector array 310 is shown comprising four sections of a quad cell. In FIG. 7(*a*) the structured light source represents the code 1000000100010000100001. This code has the advantage that the sets of reference mark detector elements can be interleaved which increases the detector area for a given chip size. As will be understood, other codes could be provided which also enable the sets of reference mark detector elements to be interleaved.

FIG. 7(*b*) shows another alternative geometry of components of the read head 3. In this embodiment the structured light source has the code 110010000010100001. As can be seen in the figure, this code is not implemented with interleaved reference mark photodetectors, instead the reference mark photodetector array has sections J, K, L, M which overlap in the measurement direction x.

FIG. 7(*c*) shows an arrangement of components for the code 111001100011011011.

In alternative embodiments, each part 310*a*, 310*b*, 310*c* of the reference mark photodetector array 310 may be made up of only two sections, i.e. be a bi-cell which may have a first part K and a second part L. In such an embodiment, a gate signal may be obtained by combining the outputs of sections K and L as shown in equation 3 and applying a threshold, while a zero-crossing may be detected using by combining the outputs of the sections K, L as shown in equation 4 and monitoring when equation 4 has a value of 0.

$$K+L \tag{3}$$

$$K-L \tag{4}$$

In further embodiments each section of the parts of the reference mark photodetector 310 may have a width equal to an integer multiple of the period of the fringe pattern formed thereon and be space apart such that their centres are spaced apart by an integer multiple of the fringe field formed thereon.

While the invention has been described above in connection with at least one embodiment, it will be appreciated that a number of other embodiments are possible without departing from the scope of the claims. For example, the incremental track of the scale 2 may comprise an amplitude (or "Ronchi") scale, instead of the above described phase scale. Further, FIGS. 7(*a*) to (*c*) show the components of the readhead 3 in various configurations, it will be understood that the location of a component in a direction perpendicular to the measurement x can be varied. While the embodiments above describe a linear measurement encoder, the encoder could be a rotary measurement encoder. In other embodiments the structured light source could be provided by a mask located over a light source, the light source may be an extended light source. As will be understood, rather than the grating being formed directly on the structured light source, the grating may be provided on a separate element spaced apart from the structured light source. Alternatively, there could be provided a grating subsequent to the scale for interacting with light from the scale to form the resultant field (e.g. fringe field, for example interference fringe, at the incremental photodetector). Furthermore, a separate light source could be provided for illuminating the incremental scale track and for forming the resultant field at the incremental photodetector. However, our inventors found that the same light source could be used, and that by using the structured light source for illuminating the incremental scale track and for forming the resultant field at the incremental photodetector is a particularly advantageous arrangement. In particular, it can reduce the number of components needed, the size of the readhead. Also, it reduces background illumination levels, which reduce signal noise, and reduces the required amplifier dynamic range needed to process the signals.

In still other embodiments, the reference mark photo detector array may be configured to detect a decrease in brightness when the readhead is in the reference mark position relative to the scale. An example embodiment of such an incremental measurement encoder may comprise a structured light source having the code 101001 (as shown in FIG. 3), the reference mark photodetector array may have parts corresponding to the code 011010 (where a "1" is used to indicate the presence of a photodetector and a "0" is used to indicate the absence of a photodetector), i.e. have parts arranged to correspond to areas of the image of the structured light source where a drop in illumination from a background level of illumination to a lower level of illumination is expected when the readhead is in the reference mark position in relation to the scale. As will be understood, in this case, the graph of FIG. 6(*a*) would look be the same, but be upside down, such that a negative pulse, or "dip", in the signal from each set of photodetector elements would occur as the readhead passes the reference mark.

So far, all the examples have used a single mark (single imaging element) on the scale to form an image of the coded source. However, it is possible for a reference mark to comprise a plurality imaging elements. Each of the imaging elements forms an image of the coded source, but each image is laterally shifted by an amount determined by the position of each mark on the scale. This produces a much more complex pattern on the reference mark detectors. An example embodiment of this is schematically shown in FIG. 8.

The invention claimed is:

1. An incremental measurement encoder comprising:

a scale comprising a periodic series of features forming an incremental track and at least one reference mark;

a structured light source; and a reference mark photodetector array, wherein:

the at least one reference mark comprises a first pinhole and a second pinhole, the first pinhole and the second pinhole configured to image the structured light source by a pinhole effect and thereby form a spatially inverted representation of the structured light source as an image of the structured light source on the reference mark photodetector array.

2. The incremental measurement encoder according to claim 1, wherein the at least one reference mark is embedded within the incremental track.

3. The incremental measurement encoder according to claim 1, wherein the structured light source comprises an array of unevenly spaced light sources.

4. The incremental measurement encoder according to claim 1, wherein the structured light source emits incoherent light.

* * * * *